(12) United States Patent
Khan et al.

(10) Patent No.: US 11,551,318 B2
(45) Date of Patent: Jan. 10, 2023

(54) WAGE GARNISHMENTS PROCESSING USING MACHINE LEARNING FOR PREDICTING FIELD VALUES

(71) Applicant: ADP, Inc., Roseland, NJ (US)

(72) Inventors: Azhar Khan, Pune (IN); Arjun Hegde, Pasadena, CA (US); Dhirendra Kumar, Hyderabad (IN); Fayaz Shaik, Hyderabad (IN); Srinivas Kulkarni, Hyderabad (IN); Ravi Kumar Tadysetty, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 758 days.

(21) Appl. No.: 16/518,739

(22) Filed: Jul. 22, 2019

(65) Prior Publication Data
US 2021/0027403 A1 Jan. 28, 2021

(51) Int. Cl.
*G06Q 50/18* (2012.01)
*G06K 9/62* (2022.01)
*G06N 20/00* (2019.01)

(52) U.S. Cl.
CPC .......... *G06Q 50/18* (2013.01); *G06K 9/6267* (2013.01); *G06N 20/00* (2019.01)

(58) Field of Classification Search
CPC .................................................. G06Q 50/18
See application file for complete search history.

(56) References Cited

U.S. PATENT DOCUMENTS

| | | |
|---|---|---|
| 6,738,760 B1 | 5/2004 | Krachman |
| 8,200,642 B2 | 6/2012 | Maze |
| 10,134,016 B2 * | 11/2018 | Antoo ............... G06Q 20/356 |

OTHER PUBLICATIONS

Willborn, Wage Garnishment: Efficiency, Fairness, and the Uniform Act, https://scholarship.shu.edu/cgi/viewcontent.cgi?article=1695 &context=shlr (Year: 2019).*
Sommerville, "Artificial Intelligence in HR and Payroll: Embracing Disruption," Big Data-Made Simple, Feb. 9, 2018, https://bigdata-madesimple.com/artificial-intelligence-in-hr-and-payroll-embracing-disruption/.

* cited by examiner

*Primary Examiner* — Aryan E Weisenfeld
(74) *Attorney, Agent, or Firm* — Yee & Associates, P.C.

(57) ABSTRACT

An illustrative embodiment provides a computer-implemented method for processing wage garnishment court orders includes obtaining a court order for wage garnishment for a user. The method also includes predicting values for a first subset of a number of fields for executing wage garnishment according to the court order using a rule engine. The method also includes predicting values for a second subset of the number of fields using a machine learning engine, wherein the second subset of the number of fields includes missing fields for which the rule engine could not provide a prediction. The machine learning engine includes one of a plurality of classification algorithms. The one of the plurality of classification algorithms selected to use for the machine learning engine for predicting field values is selected according to at least one of accuracy, speed, size of model, and explainability.

30 Claims, 5 Drawing Sheets

WAGE GARNISHMENTS PROCESSING USING MACHINE LEARNING FOR PREDICTING FIELD VALUES

BACKGROUND INFORMATION

1. Field

The present disclosure relates generally to an improved computer system and, in particular, to an improved payroll system and, even more particularly, to a method and system for wage garnishments using machine learning to predict field values of the interpretation record and to reduce or eliminate manual processing.

2. Background

Human capital management (HCM) systems are software based solutions for administering various human resource functions such as payroll, tax, and employee benefits. As part of the payroll administration, a HCM solution determines the amount of money to deduct from an employee's paycheck for various taxes and employee contributions to various employer provided benefits such as retirement plans, health insurance, and life insurance. Some employees may also be subject to having a portion of their wages garnished to satisfy a court order or governmental agency order. These various wage garnishment orders are also processed by the HCM systems in order to accurately deduct the appropriate amount from an employee's pay and allocate the deducted amount appropriately to the appropriate entity entitled to the deducted amount.

Many HCM systems are services provided by a human resource service management entity to a number of client employers. This enables the client employers to offload these HCM functions to a third party thereby allowing the client employer to focus their resources on their business rather than ancillary HCM matters. Often the human resource service management entity has a large number of clients and each client may have different rules and regulations that apply to it in managing their employee benefits. Furthermore, each jurisdiction within which the client employer does business may have its own courts and agencies issuing wage garnishment requests with each separate court and agency having particular rules unique to itself. Additionally, each wage garnishment request may be unique to the individual to which it applies. Therefore, a large number of rules are typically required to be entered into an HCM system in order to appropriately handle each wage garnishment request. Often, the rules for each wage garnishment request must be entered manually thereby decreasing the efficiency in operation of the HCM system and introducing many opportunities for errors. Therefore, an improved HCM system for handling wage garnishments is desirable.

SUMMARY

An illustrative embodiment provides a computer-implemented method for processing wage garnishment court orders includes obtaining a court order for wage garnishment for a user. The method also includes predicting values for a first subset of a number of fields for executing wage garnishment according to the court order using a rule engine. The method also includes predicting values for a second subset of the number of fields using a machine learning engine, wherein the second subset of the number of fields includes missing fields for which the rule engine could not provide a prediction. The machine learning engine includes one of a plurality of classification algorithms. The one of the plurality of classification algorithms selected to use for the machine learning engine for predicting field values is selected according to at least one of accuracy, speed, size of model, and explainability.

Another illustrative embodiment provides a system for processing wage garnishment court orders includes a bus system and a storage device connected to the bus system, wherein the storage device stores program instructions. The system also includes a number of processors connected to the bus system, wherein the number of processors execute the program instructions to obtain a court order for wage garnishment for a user. The number of processors also execute the program instructions to predict values for a first subset of a number of fields for executing wage garnishment according to the court order using a rule engine. The number of processors also execute the program instructions to predict values for a second subset of the number of fields using a machine learning engine, wherein the second subset of the number of fields comprises missing fields for which the rule engine could not provide a prediction. The machine learning engine includes one of a plurality of classification algorithms. The one of the plurality of classification algorithms selected to use for the machine learning engine for predicting field values is selected according to at least one of accuracy, speed, size of model, and explainability.

Yet another illustrative embodiment provides a computer program product for processing wage garnishment court orders includes a non-transitory computer readable storage medium having program instructions embodied therewith. The program instructions are executable by a number of processors to cause the computer to perform the steps of obtaining a court order for wage garnishment for a user and predicting values for a first subset of a number of fields for executing wage garnishment according to the court order using a rule engine. The program instructions are also executable by a number of processors to cause the computer to perform the step of predicting values for a second subset of the number of fields using a machine learning engine, wherein the second subset of the number of fields comprises missing fields for which the rule engine could not provide a prediction. The machine learning engine includes one of a plurality of classification algorithms. The one of the plurality of classification algorithms selected to use for the machine learning engine for predicting field values is selected according to at least one of accuracy, speed, size of model, and explainability.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account wage garnishment record system (WGRS) applications are used to process court orders and that existing WGRS applications are inefficient. The illustrative embodiments recognize and take into account that WGRS application processing involves operators/specialists manually executing rules written in different sources of documentation and knowledge bases. The illustrative embodiments further recognize and take into account that WGRS systems process wage garnishment court orders of different lien types like student loans, child support, tax levies, and bankruptcy. The illustrative embodiments further recognize and take into account that WGRS systems receive court orders from different states and jurisdictions. The illustrative embodiments further recognize and take into account that a WGRS system provide may have thousands of employer clients who use different pay systems.

The illustrative embodiments further recognize and take into account that in order to process a court order, WGRS system specialists must compute employer fee, lien priority, deduction calculation codes, garnishment rules, and many other fields using different rules based on lien type, pay system, and state or jurisdiction. The illustrative embodiments further recognize and take into account that the number of rules may run into several thousands of rules. The illustrative embodiments further recognize and take into account that these rules are documented in different places and WGRS operation specialists must manually compute the fields using these rules. The illustrative embodiments further recognize and take into account that manually entry of these rules leads to significant labor costs and manual errors in order processing.

Illustrative embodiments provide an automated system to reduce or eliminate manual work in entering and computing the various rules and fields discussed above and to improve quality. Illustrative embodiments further provide a rule engine supplemented with a machine learning (ML) engine to accurately and efficiently code the various rules and fields necessary to properly execute wage garnishment orders. Illustrative embodiments provide a method for selecting an appropriate algorithm for executing the ML engine as well as for training the ML engine. Illustrative embodiments also provide a method for determining when an ML engine has been sufficiently trained such that execution of coding rules and fields may be offloaded from manually entry to the ML engine. These and other benefits of the present disclosure will be recognized by those skilled in the art.

Figure 1:
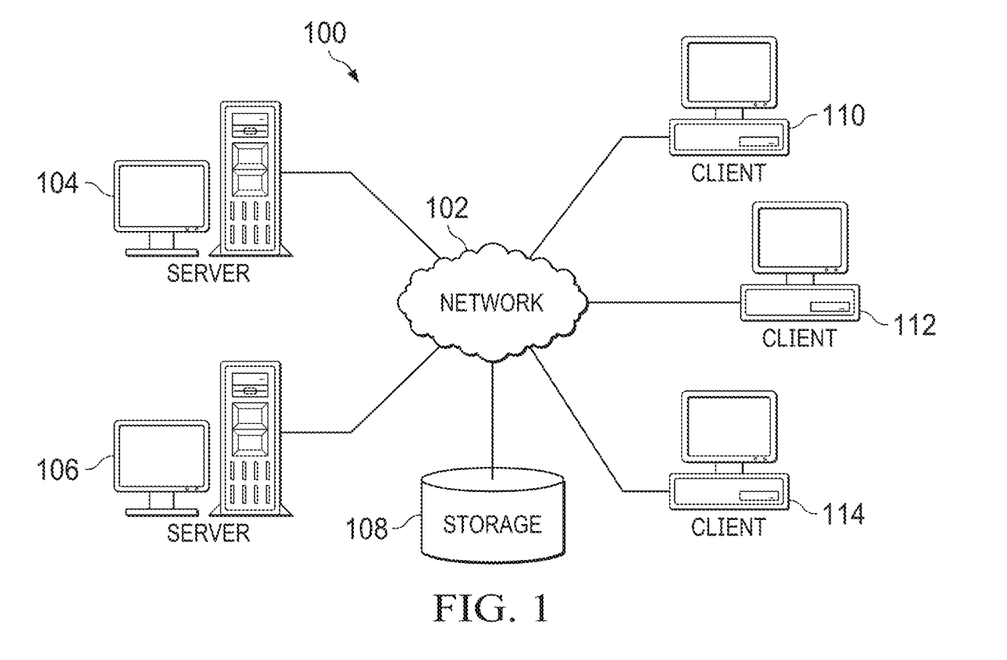
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Turning now to a discussion of machine learning, there are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
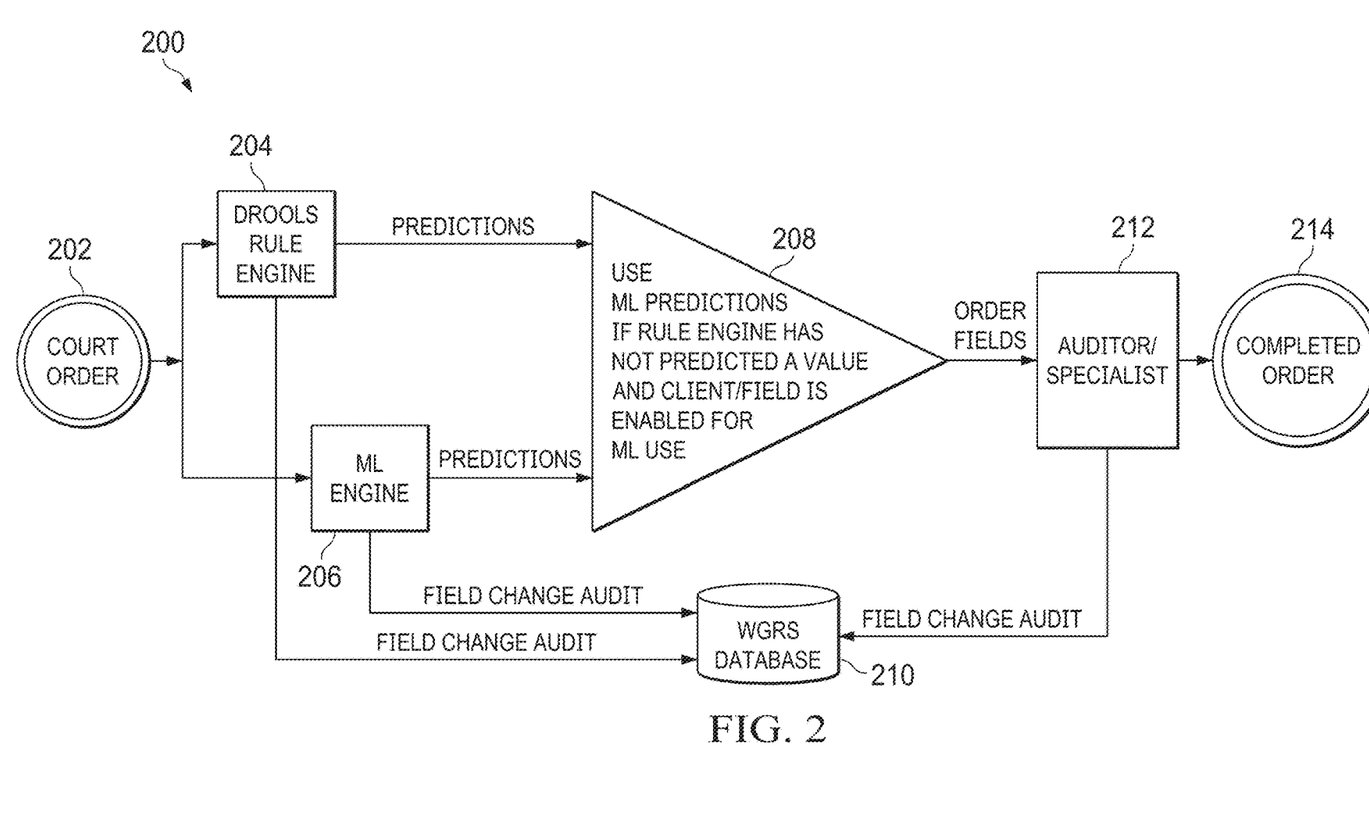
FIG. 2 is a diagram of a system for processing wage garnishment court orders in accordance with an illustrative embodiment.

Turning now to FIG. 2, a diagram of a system for processing wage garnishment court orders is depicted in accordance with an illustrative embodiment. System 200 includes rule engine 204 and machine learning (ML) engine 206. In an embodiment, ML engine 206 implements one or more of a decision tree algorithm, a k-nearest neighbors algorithm, a Naïve Bayes algorithm, and a random forest algorithm. In other embodiments, other algorithms may also be used. In an embodiment, several algorithms are tested to predict various values and a one of the algorithms that is judged to provide results that best fit a set of criteria is selected to use in a final version. In an embodiment, rule engine 204 is a Drools rule engine. Court order 202 is received by rule engine 204 and ML engine 206. The rule engine contains a set of rules for processing court orders. Rule engine 204 makes predictions for various field values that may be required for processing the court order. ML engine 206 also makes predictions about client and field values based on court order 202. Decision block 208 uses rule engine predictions for some client and field values and uses ML engine 206 predictions for client and field values that were not predicted by rule engine 204 to complete order fields to present to auditor/specialist 212 who provides completed order 214. Rule engine 204, ML engine 206, and auditor/specialist 212 store field change audits to Wage Garnishment Records System (WGRS) database 210. Field change audits are audit trails or an audit history that remembers changes over a period of time. Thus, an audit of changed field values is saved after rule engine 204 processing and ML engine 206 processing. To compute the accuracy of predictions by rule engine 204 and ML engine 206, the respective audit record is compared with final values. Examples of field values to be predicted include wage garnishment deduction calculation, fee amount, wage garnishment type, payment schedule, account to be credited, etc.

In an embodiment, rule engine 204 predicts fields for court order 202. Rule engine 204 is expected to compute correct values. However, rules can fail for certain conditions thereby resulting in no prediction. Next, ML engine 206 predicts the missing fields for which rule engine 204 could not predict. The ML prediction may not be correct for a new client for which it is not trained. This can be controlled through a flag at each client level or output field level which decides if ML engine 206 predictions should be used. Once ML engine 206 is sufficiently trained, a flag can be set or removed (depending on implementation) to indicate that ML engine 206 predictions are accurate and usable.

Figure 3:
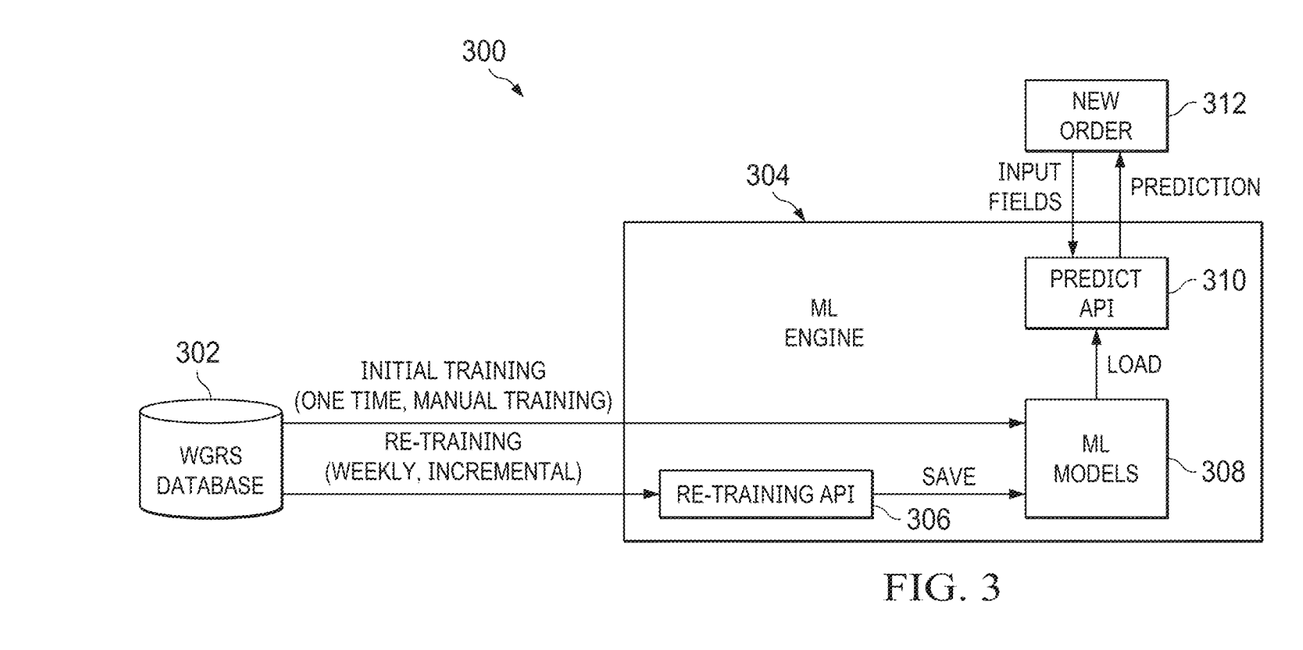
FIG. 3 is a diagram of a system for training an ML engine in accordance with an illustrative embodiment.

Turning now to FIG. 3, a diagram of a system for training an ML engine is depicted in accordance with an illustrative embodiment. System 300 includes WGRS database 302 and ML engine 304. ML engine 304 may be implemented as ML engine 206 in FIG. 2 and WGRS database 302 may be implemented as WGRS database 210 in FIG. 2. WGRS database 302 stores various predicted values predicted by the rule engine, such as rule engine 204, and/or ML engine 304. ML engine 304 may include several different ML models 308. Each model in ML models 308 may be a different algorithm. ML engine 304 also includes predict application program interface (API) 310 and re-training API 306. Initially, ML models 308 are trained manually using data already acquired. For example, in an embodiment, ML models 308 are initially trained using the last one year of data. Once trained, one or more ML models 308 are loaded into predict API 310 which uses input fields from new order 312 and one of ML models 308 to make a prediction of a field value for new order 312. Occasionally, ML Models 308 are retrained by re-training API 306 using data from WGRS database 302. The re-training may be periodic or aperiodic. In an embodiment, ML models 308 are re-trained weekly. The initial training requires manual input of data to the WGRS database. However, in an embodiment, the re-training is performed without the aid of manual input. In an embodiment, the models are incrementally re-trained every week using orders generated in that week. The input fields may include lien features and client profile features. Trained ML models 308 are used for real time predictions. Examples of lien features are shown in Table 1 below.

TABLE 1

Lien Features

Additional Standard Deduction Indicator
Bankruptcy on File Indicator
Debtor Indicator for Wisconsin State
EIWO Order Indicator
FIPS County Code
Garnishment Deduction Frequency
Contains Arrear Amount Indicator
Indexed Only Order Indicator
Interrogatory Order Indicator
Lien Priority
Lien Status
Lien Type
Marital Status Code
Order Status Code
Page Count
Employee Payment Frequency
Internal Payment Frequency Code
Record Status
Record Type
Release Order Indicator
Site ID Examples of client profile features are shown in Table 2 below.

TABLE 2

Client Profile Features

Start Date Specification on Arrears
Client Uses Associate ID
Garnishment Deduction Frequency
Garnishment Deduction Frequency
Accruing Period
Garnishment Deduction Frequency
Employee Notification Indicator
HCM Client
Per Pay Employee Fee TABLE 2-continued Client Profile Features Recurring Employer Fee
State Employee Fee
Admin Fee Frequency Same as Payment Frequency
Combined or Separate
Not Relevant Field
Not Relevant Field
Not Relevant Field
Monthly Limit
Not Relevant Field
Pay System
Payment Schedule
Site ID
Student Loan Keyed as Writ
Support Order Indicator As mentioned above, ML models 308 may include several different algorithms. Each algorithm in ML models 308 may be trained, but only one of the algorithms in ML models 308 is used by predict API 310 to make predictions. The particular algorithm used by predict API 310 is selected according to one or more factors including, for example, accuracy, efficiency, explainability, amount of resources utilized, and speed of algorithm. The weighting of the factors may depend on the implementation and the needs and desires of the organization utilizing ML engine 304. For example, in some implementations, accuracy may be the most heavily weighted factor while in other implementations, the speed of the algorithm may be the most heavily weighted factor in selecting the algorithm. In some embodiments, a single criterion may be utilized to select the algorithm. Explainability is the ability of the algorithm to provide an insight into how the predictions were made. Table 3 below is a table showing various fields, the training size for each field, the testing size, the prediction accuracy without null/empty values and with null/empty values for a single algorithm.

TABLE 3

| | Without NULL/EMPTY values | | | With NULL/EMPTY values | | | | |
| | | | | Training Size | | | | |
| Dependent Field | Training Size | Testing Size | Prediction Accuracy | All | No. of Records with NULL Value | Testing Size | Prediction Accuracy | Prediction Accuracy for NULL Records |
| --- | --- | --- | --- | --- | --- | --- | --- | --- |
| ACCR_PER | 313,714 | 16,512 | 95.03% | 313,714 | — | 16,512 | 94.83% | |
| BILLABLE_IND | 313,714 | 16,512 | 92.67% | 313,714 | — | 16,512 | 92.40% | |
| CHK_PYBL_CD | 313,714 | 16,512 | 95.10% | 313,714 | — | 16,512 | 95.03% | |
| DED_CALC_CD | 313,714 | 16,512 | 97.94% | 313,714 | — | 16,512 | 97.82% | |
| DED_PCT | 247,967 | 13,051 | 94.85% | 313,714 | 65,747 | 16,512 | 92.09% | 84.28 |
| ER_FEE_AMT | 24,285 | 1,277 | 93.58% | 313,714 | 289,456 | 16,512 | 98.58% | 99.83 |
| FEDERAL_WRIT_IND | 256,625 | 13,507 | 99.63% | 313,714 | 57,089 | 16,512 | 89.50% | 74.08 |
| GRNSH_SUPP_TYP | 313,714 | 16,512 | 98.39% | 313,714 | — | 16,512 | 98.34% | |
| INTROGTRY_IND | 102,738 | 5,408 | 99.98% | 313,714 | 210,976 | 16,512 | 95.48% | 97.32 |
| NOTIF_IND | 313,708 | 16,511 | 93.51% | 313,714 | 6 | 16,512 | 93.51% | |
| PMT_SCHE_CD | 313,714 | 16,512 | 96.33% | 313,714 | — | 16,512 | 96.24% | |
| RULE_NM | 313,714 | 16,512 | 95.62% | 313,714 | — | 16,512 | 96.20% | |
| SENT_TO_CL_IND | 313,714 | 16,512 | 94.05% | 313,714 | — | 16,512 | 93.93% | |

Table 4 below is a table showing prediction accuracy for various fields for four different algorithms. The four algorithms shown in Table 4 are decision tree, random forest, naïve Bayes, and k-nearest neighbors.

TABLE 4

|  |  |  | Prediction Accuracy | | | |
| --- | --- | --- | --- | --- | --- | --- |
| Dependent Field | Training Size | Testing Size | Decision Tree | Random Forest | Naive Bayes | K-Nearest Neighbors |
| ACCR_PER | 97,223 | 5,117 | 95.70% | 95.08% | 92.12% | 95.49% |
| BILLABLE_IND | 97,223 | 5,117 | 92.16% | 92.30% | 88.29% | 91.64% |
| CHK_PYBL_CD | 97,223 | 5,117 | 95.14% | 95.22% | 89.45% | 95.30% |
| DED_CALC_CD | 97,223 | 5,117 | 95.34% | 95.46% | 94.12% | 95.03% |
| DED_PCT | 97,223 | 5,117 | 92.53% | 93.18% | 88.08% | 91.95% |
| ER_FEE_AMT | 97,223 | 5,117 | 96.16% | 96.89% | 90.81% | 95.65% |
| FEDERAL_WRIT_IND | 97,223 | 5,117 | 96.34% | 96.17% | 89.58% | 95.50% |
| GRNSH_SUPP_TYP | 97,223 | 5,117 | 96.67% | 96.69% | 91.56% | 96.85% |
| INTROGTRY_IND | 97,223 | 5,117 | 96.79% | 96.96% | 96.16% | 96.34% |
| NOTIF_IND | 97,223 | 5,117 | 94.35% | 95.09% | 92.34% | 93.78% |
| PMT_SCHE_CD | 97,223 | 5,117 | 95.31% | 95.62% | 88.24% | 94.49% |
| RULE_NM | 97,223 | 5,117 | 95.88% | 95.43% | 89.47% | 92.96% |
| SENT_TO_CL_IND | 97,223 | 5,117 | 94.08% | 93.55% | 89.66% | 93.00% |

Table 5 below shows an example chart for use in an illustrative embodiment for selecting the algorithm.

TABLE 5

| Algorithm | Accuracy | Speed | Size of Model | Explainability |
| --- | --- | --- | --- | --- |
| Decision Tree | 4.5 | 4 | 4 | 5 |
| k-Nearest Neighbors | 3 | 3 | 3 | 1 |
| Naïve Bayes | 2 | 5 | 5 | 1 |
| Random Forest | 5 | 2 | 1 | 1 |

In Table 5, a value is assigned for accuracy speed, size of model, and explainability for each algorithm where the values range from 1 to 5 where 1 is poor, 2 is average, 3 is good, 4 is very good, and 5 is excellent. In the illustrated example in Table 5, decision tree scores very good in all areas. K-NN is good in all areas as well, but scores lower than decision tree. Naïve Bayes produces a small-sized model and provides good training and prediction times, but scores average on accuracy. Random forest is excellent in accuracy, but produces large sized models which are an issue for pre-loading and adds to increased training and prediction times. Decision tree debugging is easier with tree navigation. Other models require complex mathematical calculations for debugging output, which is non-intuitive and for which there is no out-of-box feature.

In an embodiment, ML engine 304 uses WEKA library (Java) for machine learning algorithms and uses the following classification algorithms: decision tree (primary—used for live prediction), random forest, Naïve Bayes, and k-nearest neighbor. In an embodiment, the decision tree algorithm is selected for use by predict API 310 as the primary algorithm for live prediction due to scalability and accuracy. Predictions from other algorithms are run and saved asynchronously. A comparative analysis can be done later to find the most effective APIs.

In an embodiment, for ML engine 304 deployment, existing Java infrastructure can be re-used as: (1) ML engine uses Java technology stack; (2) ML APIs do not require any special hardware; (3) initial training is done offline; (4) prediction API consumes resources like a simple normal application API; and (5) re-training is run as a batch job in off load hours. APIs can be used as Java or REST APIs. In an embodiment, a NoSQL database is used for prediction analysis.

Below is a sample input JSON to prediction API 310.

```
{
    "data": {
        "ADDL_STD_DED_IND": "0",
        "BANKUPTCY_INDICATOR": "B",
        "DEBTOR_IND": "N",
        "EIWO_IND": "N",
        "FIPS_CD": "4200000",
        "GRNSH_FREQ_CD": "M",
        "HAS_ARREARS": "N",
        "INDX_ONLY_IND": "N",
        "INTR_FLAG": "Y",
        "LIEN_PRTY_CD": "S",
        "LIEN_STS_CD": "A",
        "LIEN_TYP_CD": "L",
        "MARI_STS_CD": "S",
        "ORD_ST_CD": "NC",
        "PAGE_CNT": "1",
        "PAY_FREQ": "M",
        "PAYMENT_FRQ_CD": "M",
        "REC_STS_CD": "A",
        "RECORD_TYPE_CD": "",
        "RELEASE_ORDER_IND": "N",
        "SITE_ID": "FSG1"
    }
}
```

Below is a sample output JSON from prediction API 310.

```
{
    "data": {
        "ACCR_PER": "3",
        "BILLABLE_IND": "Y",
        "CHK_PYBL_IND": "P",
        "DED_CALC_CD": "P",
        "DED_PCT": "25"
        "ER_FEE_AMT": "5",
        "FEDERAL_WRIT_IND": "N",
        "GRNSH_SUPP_TYP": "C",
        "INTROGTRY_IND": "I",
        "NOTIF_IND": "N",
        "PMT_SCHE_CD": "PAY",
        "RULE_NM": "SUP/DEP",
        "SENT_TO_CL_IND": "Y"
    }
}
```

Figure 4:
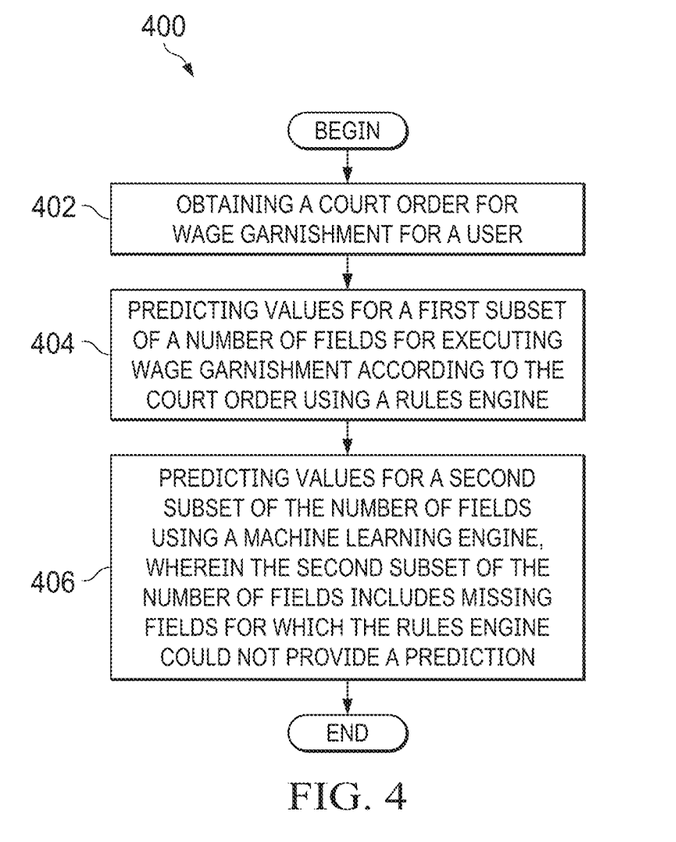
FIG. 4 is a flowchart of a method for processing wage garnishment court orders in accordance with an illustrative embodiment.

Turning now to FIG. 4, a flowchart of a method for processing wage garnishment court orders is depicted in accordance with an illustrative embodiment. Method 400 begins at step 402 where the wage garnishment processing engine obtains a court order for wage garnishment for a user. Next, the wage garnishment processing engine predicts values for a first subset of a number of fields for executing the wage garnishment according to the court order using a rules engine (step 404). Next, the wage garnishment processing engine predicts values for a second subset of the number of fields using a machine learning engine, wherein the second subset of the number of fields includes missing fields for which the rules engine could not provide a prediction (step 406).

In an illustrative embodiment, the plurality of classification algorithms comprises a decision tree algorithm, a random forest algorithm, a Naïve Bayes algorithm, and a K-nearest neighbor algorithm. In an illustrative embodiment, the method further includes performing a comparative analysis of the plurality of classification algorithms to select the one of the plurality of classification algorithms selected to use for the machine learning engine for predicting field values. In an illustrative embodiment, the machine learning engine is trained from historic data. In an illustrative embodiment, the method further includes saving an audit of changed field values after rule engine processing and machine learning engine processing. In an illustrative embodiment, the method further includes comparing a respective audit record of field value predictions from the rule engine and from the machine learning engine with final values to determine an accuracy of the predictions from the rule engine and from the machine learning engine. In an illustrative embodiment, the method further includes performing initial training of the machine learning engine from manual training and re-training the machine learning engine periodically without manual training. In an illustrative embodiment, the method further includes determining whether to use machine learning engine according to a flag which indicates whether the machine learning engine has been trained such that the accuracy of the predicted values from the machine learning engine exceed a threshold accuracy. In an illustrative embodiment, manual entry of field values for which the rule engine failed to provide a prediction is performed until the machine learning engine has been trained. In an illustrative embodiment, the rule engine is a Drools rule engine.

Illustrative embodiments provide the technical improvement of a data processing system that minimizes human input in processing wage garnishment orders. In particular, in an illustrative embodiment, an improved data processing system is provided that uses machine learning to predict field values for processing wage garnishment court orders reducing the need for a human to input various field values.

Figure 5:
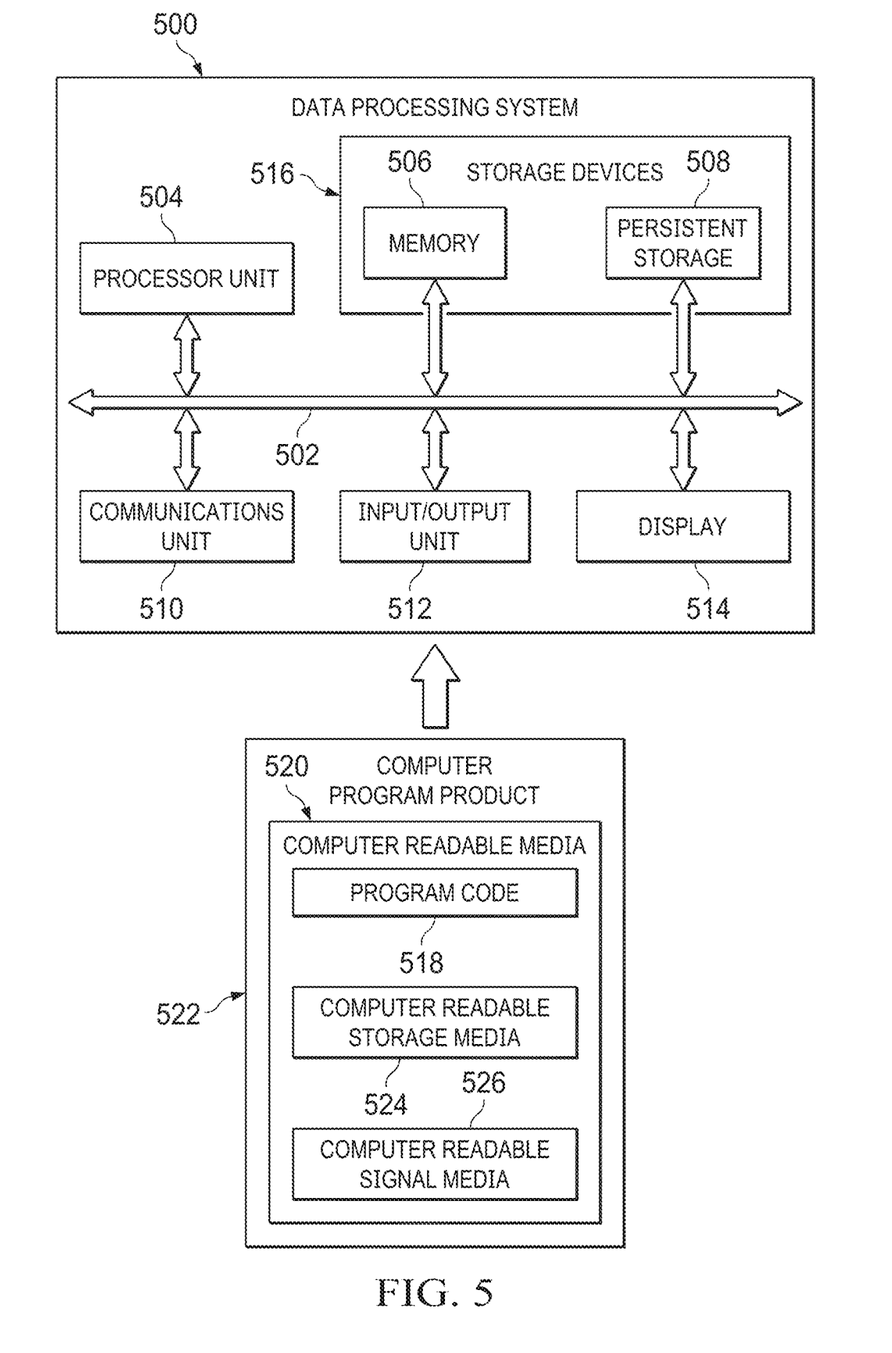
FIG. 5 is an illustration of a block diagram of a data processing system in accordance with an illustrative embodiment.

Turning now to FIG. 5, an illustration of a block diagram of a data processing system is depicted in accordance with an illustrative embodiment. Data processing system 500 may be used to implement one or more computers and client computer system 112 in FIG. 1. In this illustrative example, data processing system 500 includes communications framework 502, which provides communications between processor unit 504, memory 506, persistent storage 508, communications unit 510, input/output unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation. In an embodiment, processor unit 504 comprises one or more conventional general purpose central processing units (CPUs). In an alternate embodiment, processor unit 504 comprises one or more graphical processing units (CPUs).

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 516, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508. Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518. Alternatively, program code 518 may be transferred to data processing system 500 using computer-readable signal media 526.

Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for processing wage garnishment court orders, the method comprising:
    obtaining a court order for wage garnishment for a user from a plurality of users;
    predicting values for a first subset of a number of fields for executing wage garnishment according to the court order using a rule engine;
    training a machine learning engine comprises a plurality of machine learning models with a plurality of classification algorithms, wherein each machine learning model from the plurality of machine learning models comprises a different classification algorithm from the plurality of classification algorithms;
    predicting values for a second subset of the number of fields using a machine learning model from the machine learning engine, wherein the second subset of the number of fields comprises missing fields for which the rule engine could not provide a prediction, and wherein the machine learning model selected to use for predicting field values is selected according to at least one of accuracy, speed, size of model, and explainability;
    automatically receiving executed court orders for wage garnishment for the plurality of users in a period of time;
    extracting lien features and client profile features from the executed court orders received for the plurality of users in the period of time; and
    periodically retraining the machine learning engine using the lien features and client profile features from the executed court orders for wage garnishment received for the plurality of users in the period of time.

2. The method of claim 1, wherein the plurality of classification algorithms comprises a decision tree algorithm, a random forest algorithm, a Naïve Bayes algorithm, and a K-nearest neighbor algorithm.

3. The method of claim 1, further comprising:
    performing a comparative analysis of the plurality of classification algorithms to select the one of the plurality of classification algorithms selected to use for the machine learning engine for predicting field values.

4. The method of claim 1, wherein the machine learning engine is trained from historic data.

5. The method of claim 1, further comprising:
    saving an audit of changed field values after rule engine processing and machine learning engine processing.

6. The method of claim 5, further comprising:
    comparing a respective audit record of field value predictions from the rule engine and from the machine learning engine with final values to determine an accuracy of the predictions from the rule engine and from the machine learning engine.

7. The method of claim 1, further comprising:
    performing initial training of the machine learning engine from manual training; and
    re-training the machine learning engine periodically without manual training.

8. The method of claim 1, further comprising:
    determining whether to use machine learning engine according to a flag which indicates whether the machine learning engine has been trained such that the accuracy of the predicted values from the machine learning engine exceed a threshold accuracy.

9. The method of claim 8, wherein manual entry of field values for which the rule engine failed to provide a prediction is performed until the machine learning engine has been trained.

10. The method of claim 1, wherein the rule engine comprises a Drools rule engine.

11. A system for processing wage garnishment court orders, the system comprising:
a bus system;
a storage device connected to the bus system, wherein the storage device stores program instructions; and
a number of processors connected to the bus system, wherein the number of processors execute the program instructions to:
obtain a court order for wage garnishment for a user from a plurality of users;
predict values for a first subset of a number of fields for executing wage garnishment according to the court order using a rule engine;
training a machine learning engine comprises a plurality of machine learning models with a plurality of classification algorithms, wherein each machine learning model from the plurality of machine learning models comprises a different classification algorithm from the plurality of classification algorithms;
predict values for a second subset of the number of fields using a machine learning model from the machine learning engine, wherein the second subset of the number of fields comprises missing fields for which the rule engine could not provide a prediction, and wherein the machine learning model selected to use for the machine learning engine for predicting field values is selected according to at least one of accuracy, speed, size of model, and explainability;
automatically receiving executed court orders for wage garnishment for the plurality of users in a period of time;
extracting lien features and client profile features from the executed court orders received for the plurality of users in the period of time; and
periodically retraining the machine learning engine using the lien features and client profile features from the executed court orders for wage garnishment received for the plurality of users in the period of time.

12. The system of claim 11, wherein the plurality of classification algorithms comprises a decision tree algorithm, a random forest algorithm, a Naïve Bayes algorithm, and a K-nearest neighbor algorithm.

13. The system of claim 11, wherein the number of processors further execute the program instructions to:
perform a comparative analysis of the plurality of classification algorithms to select the one of the plurality of classification algorithms selected to use for the machine learning engine for predicting field values.

14. The system of claim 11, wherein the machine learning engine is trained from historic data.

15. The system of claim 11, wherein the number of processors further execute the program instructions to:
save an audit of changed field values after rule engine processing and machine learning engine processing.

16. The system of claim 15, wherein the number of processors further execute the program instructions to:
compare a respective audit record of field value predictions from the rule engine and from the machine learning engine with final values to determine an accuracy of the predictions from the rule engine and from the machine learning engine.

17. The system of claim 11, wherein the number of processors further execute the program instructions to:
perform initial training of the machine learning engine from manual training; and
re-train the machine learning engine periodically without manual training.

18. The system of claim 11, wherein the number of processors further execute the program instructions to:
determine whether to use machine learning engine according to a flag which indicates whether the machine learning engine has been trained such that the accuracy of the predicted values from the machine learning engine exceed a threshold accuracy.

19. The system of claim 18, wherein manual entry of field values for which the rule engine failed to provide a prediction is performed until the machine learning engine has been trained.

20. The system of claim 11, wherein the rule engine comprises a Drools rule engine.

21. A computer program product for processing wage garnishment court orders, the computer program product comprising:
a non-transitory computer readable storage medium having program instructions embodied therewith, the program instructions executable by a number of processors to cause a computer to perform the steps of:
obtaining a court order for wage garnishment for a user from a plurality of users;
predicting values for a first subset of a number of fields for executing wage garnishment according to the court order using a rule engine;
training a machine learning engine comprises a plurality of machine learning models with a plurality of classification algorithms, wherein each machine learning model from the plurality of machine learning models comprises a different classification algorithm from the plurality of classification algorithms;
predicting values for a second subset of the number of fields using a machine learning model from the machine learning engine, wherein the second subset of the number of fields comprises missing fields for which the rule engine could not provide a prediction, and wherein the machine learning model selected to use for predicting field values is selected according to at least one of accuracy, speed, size of model, and explainability;
automatically receiving executed court orders for wage garnishment for the plurality of users in a period of time;
extracting lien features and client profile features from the executed court orders received for the plurality of users in the period of time; and
periodically retraining the machine learning engine using the lien features and client profile features from the executed court orders for wage garnishment received for the plurality of users in the period of time.

22. The computer program product of claim 21, wherein the plurality of classification algorithms comprises a decision tree algorithm, a random forest algorithm, a Naïve Bayes algorithm, and a K-nearest neighbor algorithm.

23. The computer program product of claim 21, wherein the program instructions further comprise program instructions executable by a number of processors to cause the computer to perform the steps of:

performing a comparative analysis of the plurality of classification algorithms to select the one of the plurality of classification algorithms selected to use for the machine learning engine for predicting field values.

24. The computer program product of claim 21, wherein the machine learning engine is trained from historic data.

25. The computer program product of claim 21, wherein the program instructions further comprise program instructions executable by a number of processors to cause the computer to perform the steps of:

saving an audit of changed field values after rule engine processing and machine learning engine processing.

26. The computer program product of claim 25, wherein the program instructions further comprise program instructions executable by a number of processors to cause the computer to perform the steps of:

comparing a respective audit record of field value predictions from the rule engine and from the machine learning engine with final values to determine an accuracy of the predictions from the rule engine and from the machine learning engine.

27. The computer program product of claim 21, wherein the program instructions further comprise program instructions executable by a number of processors to cause the computer to perform the steps of:

performing initial training of the machine learning engine from manual training; and re-training the machine learning engine periodically without manual training.

28. The computer program product of claim 21, wherein the program instructions further comprise program instructions executable by a number of processors to cause the computer to perform the steps of:

determining whether to use machine learning engine according to a flag which indicates whether the machine learning engine has been trained such that the accuracy of the predicted values from the machine learning engine exceed a threshold accuracy.

29. The computer program product of claim 28, wherein manual entry of field values for which the rule engine failed to provide a prediction is performed until the machine learning engine has been trained.

30. The computer program product of claim 21, wherein the rule engine comprises a Drools rule engine.

\* \* \* \* \*